(12) United States Patent
Rohrer et al.

(10) Patent No.: US 7,474,312 B1
(45) Date of Patent: Jan. 6, 2009

(54) MEMORY REDIRECT PRIMITIVE FOR A SECURE GRAPHICS PROCESSING UNIT

(75) Inventors: Daniel Cory Rohrer, Santa Clara, CA (US); Paolo Enrique Sabella, Pleasanton, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 10/304,476

(22) Filed: Nov. 25, 2002

(51) Int. Cl.
*G06T 1/60* (2006.01)
*G09G 5/39* (2006.01)
*G06F 13/00* (2006.01)

(52) U.S. Cl. .................. 345/530; 345/531; 345/537; 345/538

(58) Field of Classification Search ............... 345/619, 345/660, 661, 670, 671, 684, 688, 686–687, 345/472, 472.2, 786, 785, 787–788, 798, 345/800, 801, 815, 822–823, 536, 537, 541, 345/543, 547, 555, 574, 531, 530, 538; 358/1.1, 358/1.2, 1.9, 1.16; 713/160–162, 155, 182, 713/190, 193, 201; 711/152, 163, 164; 726/2, 726/21, 26–29; 380/200, 201
See application file for complete search history.

(56) References Cited

U.S. PATENT DOCUMENTS

| 6,049,876 | A  | * | 4/2000 | Moughanni et al. | ......... 711/163 |
| 6,330,624 | B1 | * | 12/2001 | Cromer et al. | .............. 711/164 |
| 6,498,748 | B2 | * | 12/2002 | Ikeda | .................... 365/185.04 |
| 6,630,936 | B1 | * | 10/2003 | Langendorf | ................. 345/531 |
| 6,651,171 | B1 | * | 11/2003 | England et al. | ............. 713/193 |
| 2002/0112175 | A1 | * | 8/2002 | Makofka et al. | ............ 713/200 |
| 2002/0163522 | A1 | * | 11/2002 | Porter et al. | ................. 345/533 |
| 2003/0115472 | A1 | * | 6/2003 | Chang | ........................ 713/182 |
| 2003/0191943 | A1 | * | 10/2003 | Poisner et al. | .............. 713/181 |
| 2003/0200435 | A1 | * | 10/2003 | England et al. | ............. 713/172 |
| 2003/0204693 | A1 | * | 10/2003 | Moran et al. | ................ 711/163 |
| 2003/0233562 | A1 | * | 12/2003 | Chheda et al. | ............. 713/193 |

FOREIGN PATENT DOCUMENTS

WO          WO02/25416        *   3/2002

* cited by examiner

*Primary Examiner*—Kee M Tung
*Assistant Examiner*—Hau H Nguyen

(57) ABSTRACT

In one embodiment of the present invention, a GPU contains an authentication module at the front end, and a memory security engine and graphic memory interface at the backend. In one embodiment of the present invention, the memory security engine provides a privilege table. The programmable privilege table maps memory address ranges, and user IDs to privileges for accessing the memory address ranges. In one embodiment of the present invention, the memory security engine receives a memory access command along with an associated authenticated user ID. In one embodiment of the present invention, the memory security engine checks the authenticated user ID and address range against the privilege table. In one embodiment of the present invention, if the table indicates that the user has authorization for the particular read or write transaction to the graphic memory, the instruction is executed by the graphic memory interface. If the accessed address is not in the table, no special privileges are needed to access that address. If the table indicates that the user does not have authorization for the particular read or write transaction, the memory security engine provides a memory redirect.

50 Claims, 8 Drawing Sheets

270

| PRIVILEGE TABLE | | |
|---|---|---|
| ADDRESS RANGE 1010 | USER ID 1020 | AUTHORIZATION 1030 |
| ~ - ~ | ~ | ~ |
| ~ - ~ | ~ | ~ |
| ~ - ~ | ~ | ~ |
| ~ - ~ | ~ | ~ |
| ~ - ~ | ~ | ~ |

FIGURE 10

MEMORY REDIRECT PRIMITIVE FOR A SECURE GRAPHICS PROCESSING UNIT

FIELD OF THE INVENTION

Embodiments of the present invention relate to secure computer systems, and more particularly to a memory redirect security primitive that may be used for a graphics processing unit.

BACKGROUND OF THE INVENTION

Referring to FIG. 1, a computer system according to the conventional art is shown. As depicted in FIG. 1, the computer system comprises a central processing unit (CPU) 110 communicatively coupled to a chipset 120. System memory 130 and various input/output (I/O) devices 140 are also communicatively coupled to the chipset 120. The I/O devices may include peripherals such as a keyboard, a pointing device, a speaker, and the like.

A graphical processing unit (GPU) 160 is also communicatively coupled to the chipset 120. The GPU 160 is also communicatively coupled to graphics memory 170, and a monitor 150. The chipset 120 acts as a simple input/output hub for communicating data and instructions between the CPU 110, system memory 130, GPU 160 and/or I/O devices 170. Chipset 120 may include complex bus architectures.

Certain processes and steps are realized as a series of instructions (e.g., code) and data that reside within the system memory 130 and are executed by the CPU 110. When executed, the instructions cause the CPU 110 to provide an operating system. Furthermore, one or more applications may be executing on the CPU 110 and controlled by the operating system.

Certain graphical processes and steps are realized as a series of instructions and data that reside within GPU accessible memory 170 and are executed by the GPU 160. The CPU 110 may provide one or more instructions, commands and/or data values to the GPU 160. Furthermore, the CPU 110 and the operating systems executing thereon control the GPU 160.

The GPU 160 is responsible for creating images displayed on an I/O device 140, such as the monitor 150. The CPU 110 sends a relatively small set of drawing instructions or commands to the GPU 160. The GPU 160 executes the instructions to provide lower level image processing operations such as bitmap transfers and painting, window resizing and repositioning, line drawing, font scaling polygon drawings, and the like. The GPU 160 then writes the frame data to the graphics memory 170. The GPU 160 also reads the frame data out of the graphics memory 170 and converts it to a composite red/green/blue signal for output to the monitor 150.

Offloading image processing-intensive tasks from the CPU 110 onto the GPU 160 increases system performance. As a result, the CPU 110 utilization is advantageously reduced allowing the CPU 110 to handle other tasks, which in turn increases the system's overall processing power.

Computer systems and the various components thereof have long been subject to numerous security threats. Computers are vulnerable to intruders, unauthorized users, or authorized users attempting to perform unauthorized actions. The graphics processing subsystem is also vulnerable. Data and instructions in the graphics processing subsystem are susceptible to interruption, interception, modification, and/or fabrication. For example, passwords can be stolen by spoofing images (e.g., Trojan horse), and copyrighted material can be stolen by copying the graphics memory.

As computer systems progress, increased security becomes more critical. Increased security is required at all levels of the computer system. Thus, the graphics subsystem also requires increased security. Drivers, buggy programs, malicious programs, and the like should be prevented from acquiring, overwriting, and/or intentionally or unintentionally revealing or corrupting data.

One solution that has been proposed, is to encrypt all data values and access commands flowing to and from the graphics processor and its associated graphics memory 170. Therefore, only authorized users, having the correct encryption key, would be able to utilize the processing resources of the GPU 160 and access the graphics memory 170. However, encryption is a computational intensive process, which requires considerable processing resources. Furthermore, encryption can result in increased image processing latency in the graphics processing subsystem.

Thus, there is a continued need to provide a secure transactional method for sending data and instructions to and reading them from the GPU 160 and/or graphics memory 170.

SUMMARY OF THE INVENTION

Accordingly, embodiments of the present invention are directed toward providing secure memory transactions on a graphics processing unit (GPU). In accordance with one embodiment, a secure memory primitive at the graphics memory interface, whereby access to graphics memory is protected, provides for secure memory transactions.

In one embodiment of the present invention, the GPU is communicatively coupled to a chipset. The chipset acts as an input/output hub for communicating data and instructions between a CPU, system memory, the GPU and/or input/output (I/O) devices. The GPU is also communicatively coupled to graphics memory. The graphics memory stores instructions and data for processing by the GPU. The GPU contains an authentication module at the front end for authenticating commands, and a memory security engine and graphic memory interface at the backend.

In one embodiment of the present invention, the memory security engine contains a privilege table in memory. The programmable privilege table maps memory address ranges, and authorized user IDs to privileges for accessing the respective memory address ranges. The memory security engine receives a memory access request (with associated memory address) along with an associated authenticated user ID of the originator of the command. The command gets authenticated at the front-end of the GPU. The memory security engine checks the authenticated user ID and address against the privilege table.

If the table indicates that the user has authorization for the particular read or write transaction to the graphic memory, the instruction is executed by the graphic memory interface. If the accessed address is not in the table, no special privileges are needed to access that address. If the table indicates that the user does not have authorization for the particular read or write transaction, the memory security engine provides a memory redirect or error message. In this way, the contents of the graphics memory are held secure and available only to authorized users.

Accordingly, embodiments of the present invention effectively block-out memory locations for unauthorized memory access requests at the graphic memory interface. Embodiments of the present invention also advantageously provide a non-computational intensive security primitive. Embodiments of the present invention also advantageously provide a security primitive, which does not unduly increase image processing latency of the computer system. It is appreciated that the embodiments of the present invention may operate with any of a number of well-known authentication engines and processes to perform user identification/authentication at the front-end.

BRIEF DESCRIPTION OF THE DRAWINGS

The present invention is illustrated by way of example and not by way of limitation, in the figures of the accompanying drawings and in which like reference numerals refer to similar elements and in which:

FIG. 10 shows a diagram of a memory stored privilege table in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 1:
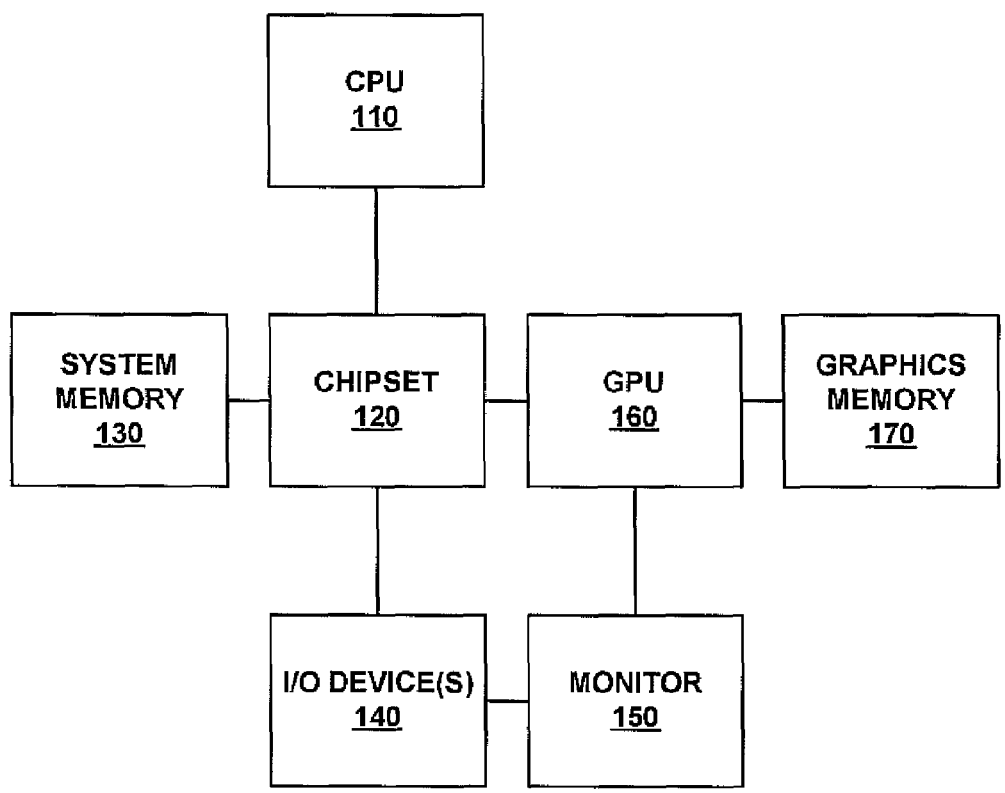
FIG. 1 shows a computer system according to the conventional art.
Figure 2:
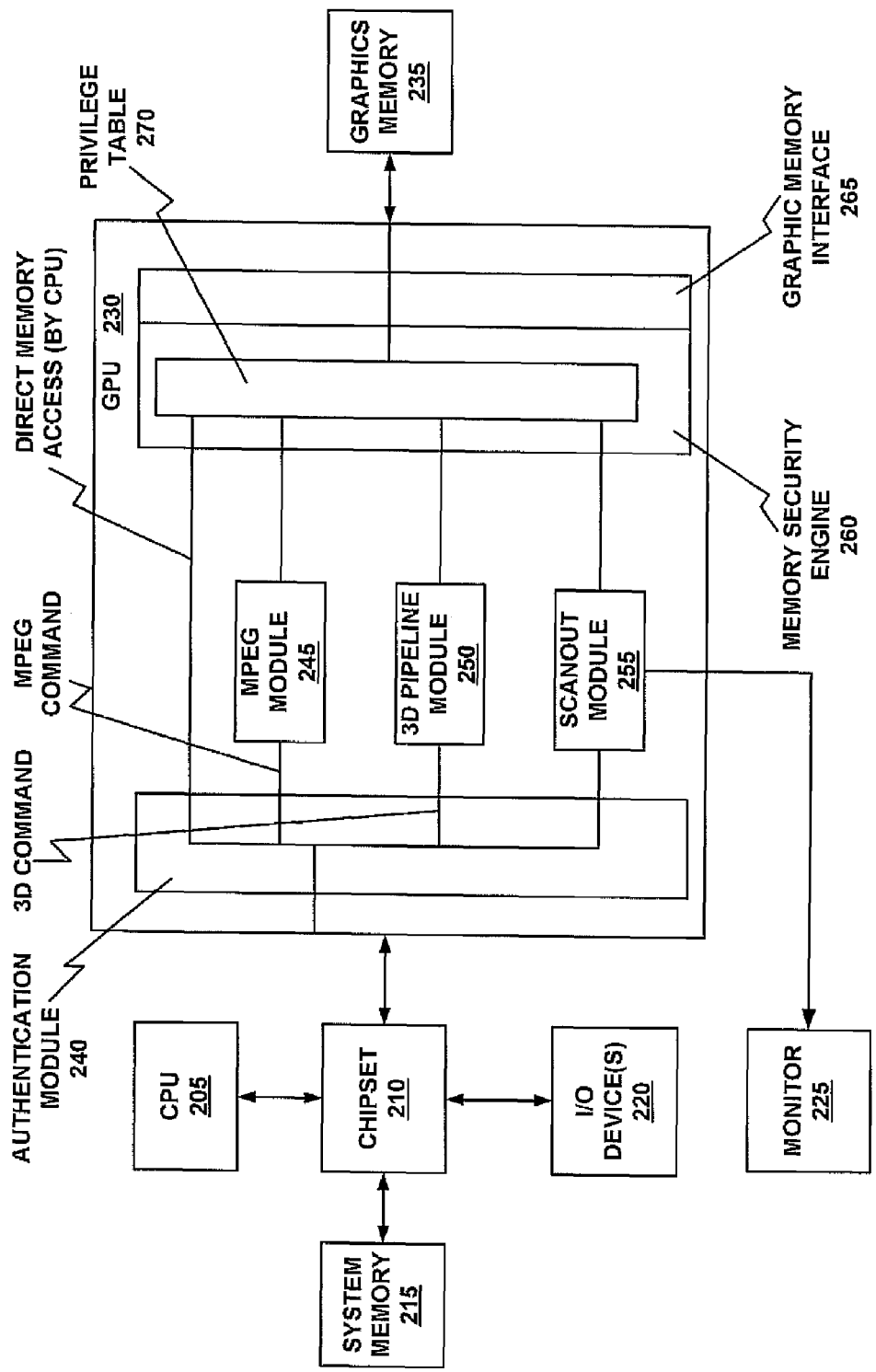
FIG. 2 shows a computer system according to one embodiment of the present invention.

Referring now to FIG. 2, a data processing system, e.g., a computer system according to one embodiment of the present invention is shown. As depicted in FIG. 2, the computer system comprises a processor or CPU 250 communicatively coupled to a chipset 210. System memory 215 and various input/output (I/O) devices 220 are also communicatively coupled to the chipset 210. Furthermore, a graphics processor unit (GPU) 230 is communicatively coupled to the chipset 210. While a monitor 225 is coupled to the GPU 230. The chipset 210 acts as an input/output hub for communicating data and instructions between the CPU 205, the system memory 215, the GPU 230, and/or the I/O devices 220. The GPU 230 is also communicatively coupled to graphics memory 235.

In an exemplary embodiment, the GPU 230 comprises an authentication module 240 at its front-end, an MPEG module 245, a 3D pipeline module 250, a scanout module 255, a memory security engine 260, a graphic memory interface 265, and the like. (The graphics memory interface is also referred to as a frame buffer interface.) The authentication module 240 is located at the front-end of the GPU 230 in one embodiment, while the memory security engine 260 and graphic memory interface 265 are located at the back-end in one example.

The graphic memory interface 265 provides for controlling reading and writing operations in the graphics memory 235, according to various GPU 230 commands. (The graphics memory is also referred to as a frame buffer.) Users of the graphics memory 235 comprise I/O devices 220, applications, the MPEG module 245, the 3D pipeline module 250, the scanout module 255, and the like.

The authentication module 240 performs authentication on received GPU 230 commands from the chipset 210 and in turn provides authenticated user IDs, which are forwarded along with associated GPU 230 commands, as the commands travel through the GPU 230. The authentication process may be provided by any applicable method.

The memory security engine 260 receives the various GPU 230 commands, concerning reading and writing to respective addresses in the graphics memory 235 (hereinafter referred to as user memory access requests), along with an authenticated user identification (ID). The memory security 260 engine contains a programmable privilege table 270, which maps memory address ranges, and user IDs to privileges for accessing the memory address ranges. The memory security engine 260 checks the address and authenticated user ID, contained in the user memory access requests, against the entries in the privilege table 270. If the table 270 indicates that the authenticated user ID has authorization for the particular read or write transaction in the graphics memory, the memory access request is executed by the graphic memory interface 265. If the accessed address is not in the table, no special privileges are needed to access the address and the graphics memory interface 265 executes the request.

If the table indicates that the user does not have authorization for the particular read or write transaction to the designated memory location, the memory security engine 260 provides a memory redirect. In one implementation, the memory security engine 260 returns a predefined value, such as all "0", if the table indicates that the user does not have authorization for reading the specified memory address range. For write access, if the table indicates that the user does not have authorization for writing to the specified memory address, the memory security engine 260 drops the memory access command. An error flag or message can also be reported for either of the above scenarios.

It is appreciated that the interface 265 and memory security engine 260 may process GPU commands that pass through any of the primitive modules, e.g., MPEG module 245, 3D pipeline module 250, scanout module 255, or directly from the CPU 205, e.g., by way of a direct memory access request.

In an optional feature of the present embodiment of the invention, any modification to an already initialized secure address range causes all contents of the memory address range to be zeroed. Such a feature prevents malicious kernel level software from disabling protection on a region of secure memory.

The present embodiment is also capable of servicing memory access requests from multiple users. The memory security engine 260 is adapted to provide context switching, allowing it to serve memory access requests from multiple users.

Thus, memory, e.g., graphics memory 235 is effectively blocked-out for unauthorized memory access requests. Even if a driver, buggy program, or other malicious software obtains a pointer to a secured memory region, the driver, buggy program or other malicious software is prohibited from acquiring or overwriting useful/valid information as a result of the secure memory address or privilege table.

Figure 3:
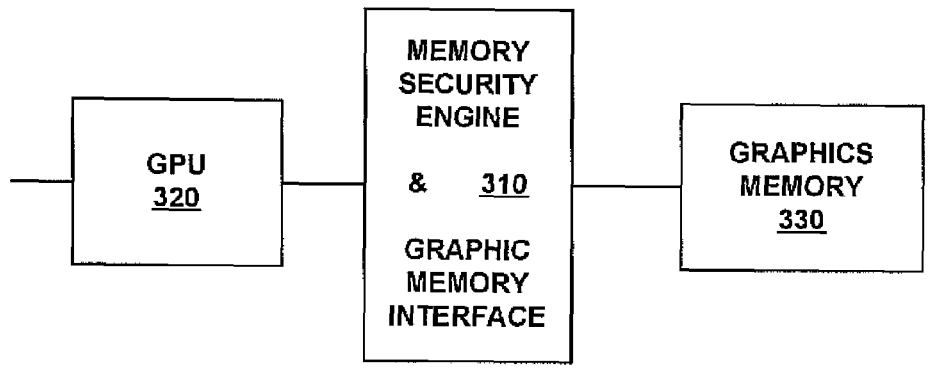
FIG. 3 shows a graphics processing subsystem according to one embodiment of the present invention.

In another implementation of the present embodiment (see FIG. 3), the memory security engine module 260 is embedded in the graphic memory interface 310. The graphic memory interface 310 stands alone in this instance. Hence the GPU 320 is communicatively coupled to the graphics memory 330, through the stand-alone graphic memory interface 310.

Figure 4:
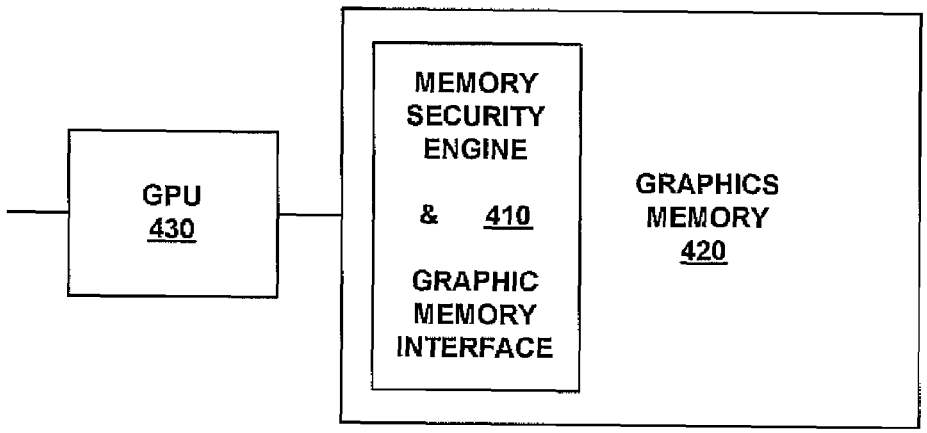
FIG. 4 shows a graphics processing subsystem according to another embodiment of the present invention.
Figure 5:
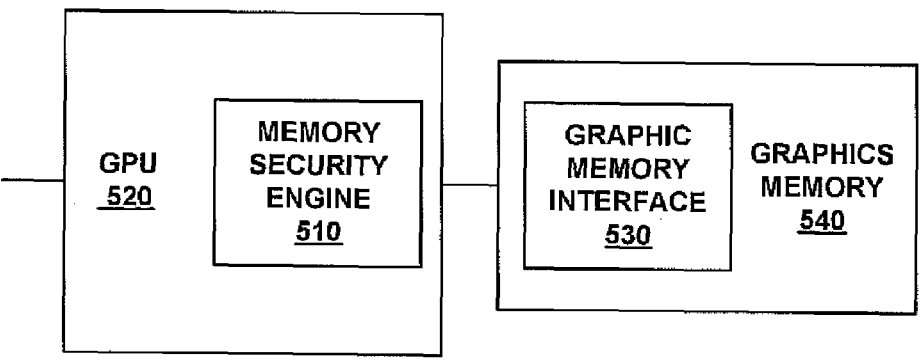
FIG. 5 shows a graphics processing subsystem according to another embodiment of the present invention.

In yet another implementation of the present embodiment, as shown in FIG. 4, the security engine module and graphic memory interface 410 are embedded in the graphics memory 420. In yet another implementation of the present embodiment, as shown in FIG. 5, the memory security module 510 is embedded in the GPU 520, while the graphic memory interface 530 is embedded in the graphics memory 540.

The memory security engine is located between the graphic memory interface and the back-end of the GPU. The memory security engine can also be located at every user access point to the graphic memory interface. The location, between the GPU and graphic memory, is where enough total information is obtained (e.g., address range and authenticated user ID) so that the memory security engine can properly determine which users can and cannot access particular content in the graphics memory. Furthermore, the memory security engine needs to be behind the GPU in one embodiment. The GPU (a general processor) can be exploited to perform unauthorized activities if the GPU is located behind the security primitive provided by the memory security engine.

Figure 6:
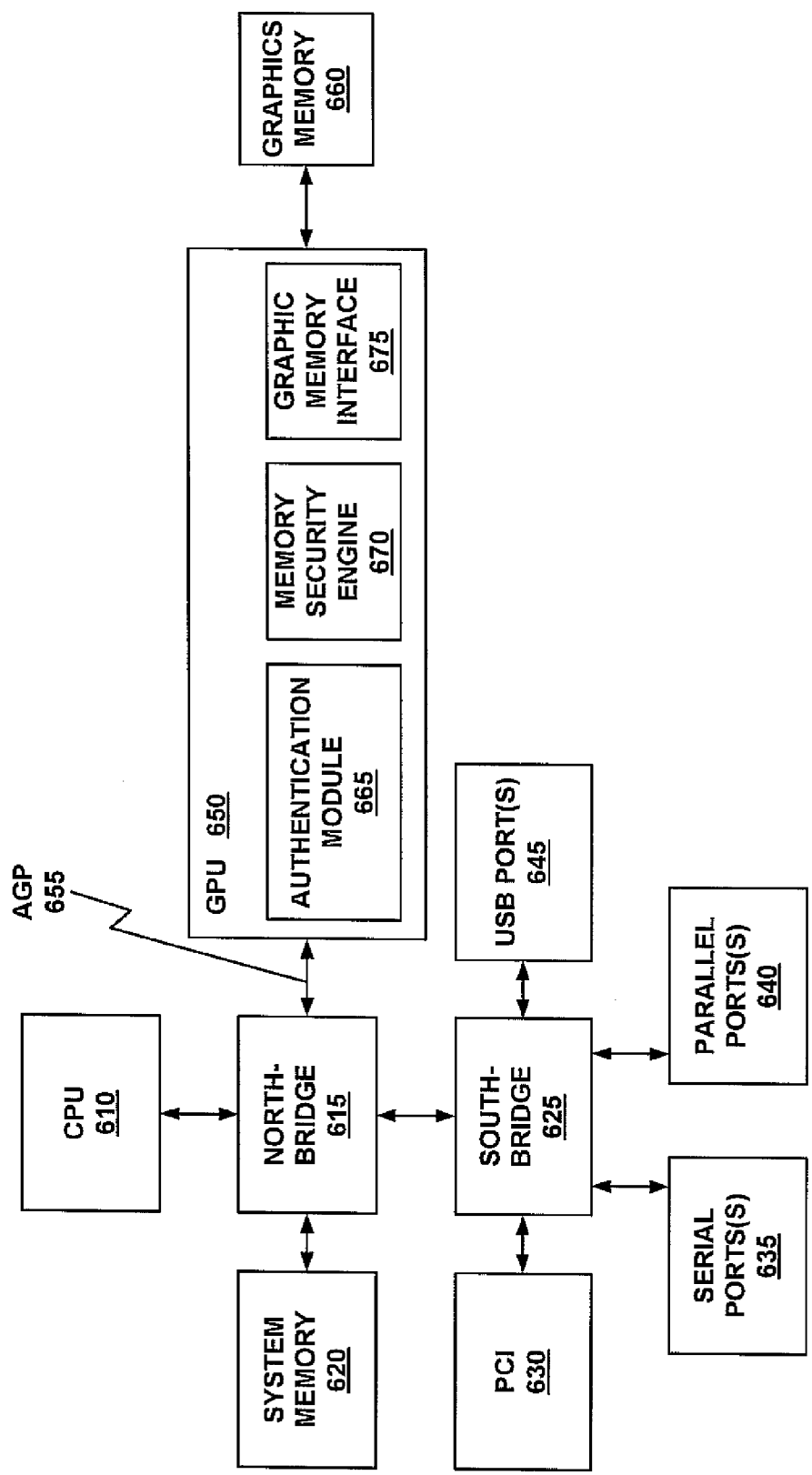
FIG. 6 shows a computer system according to another embodiment of the present invention.

Referring now to FIG. 6, a computer system according to another embodiment of the present invention is shown. As depicted in FIG. 6, the computer system comprises a CPU 610 communicatively coupled to a northbridge 615. The northbridge 615 is also communicatively coupled to system memory 620 and a southbridge 625. The southbridge 625 is communicatively coupled to various I/O ports, such as peripheral component interconnect (PCI) bus 630, serial ports 635, parallel ports 640, universal serial bus (USB) ports 645, and the like. The northbridge 615 is an example of a bridge chip, and bridge chips generally couple a CPU to the CPU's main memory. The southbridge is an example of an input/output chip, and input output chips comprise various input/output management circuits.

Furthermore, a GPU 650 is communicatively coupled to an accelerated graphics port (AGP) 655 on the northbridge 615. The GPU 650 is also communicatively coupled to graphics memory 660. In an exemplary embodiment, the GPU comprises an authentication module 665, an MPEG module, a 3D pipeline module, a scanout module, a memory security engine 670, a graphic memory interface 675, and the like. The authentication module 665 is located at the front-end of the GPU 650, while the memory security engine 670 and graphic memory interface 675 are located at the back-end.

The memory security engine 670 receives memory access requests from various users, along with an authenticated user identification (ID). The memory security engine 670 contains a programmable privilege table, which maps memory address ranges, and user IDs to privileges for accessing the memory address ranges. The memory security engine checks the address and authenticated user ID, for the user memory access requests, against the privilege table. If the table indicates that the authenticated user ID has authorization for the particular read or write transaction, the memory access request is executed by the graphic memory interface 675. If the accessed address is not in the table, no special privileges are needed to access the address.

If the table indicates that the user does not have authorization for the particular read or write transaction, the memory security engine 670 provides a memory redirect. In one implementation, the memory security engine 670 returns a predefined value, such as all "0", if the table indicates that the user does not have authorization for reading the specified memory address range. For write access, if the table indicates that the user does not have authorization for writing to the specified memory address, the memory security engine 670 drops the memory access command. Thus, memory is effectively blocked-out for unauthorized memory access requests.

Figure 7:
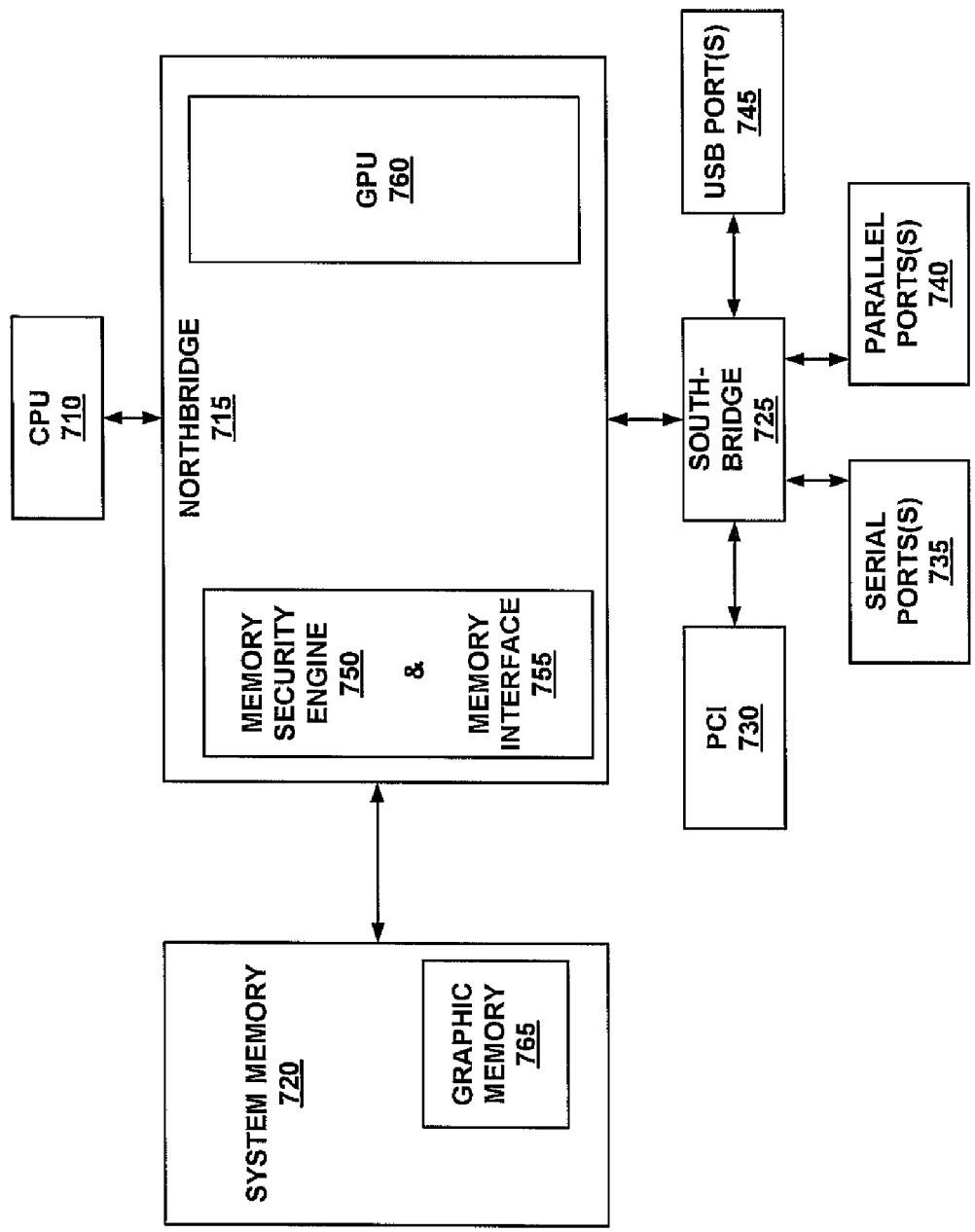
FIG. 7 shows a computer system according to another embodiment of the present invention with a northbridge-embedded memory interface.

Referring now to FIG. 7, a computer system according to another embodiment of the present invention is shown. As depicted in FIG. 7, the computer system comprises a CPU 710 communicatively coupled to a northbridge 715. The northbridge 715 is also communicatively coupled to system memory 720 and a southbridge 725. The southbridge 725 is communicatively coupled to various I/O ports, such as PCI bus 730, serial ports 735, parallel ports 740, USB ports 745, and the like.

A memory security engine 750, memory interface and GPU 755 are embedded in the northbridge 715. Furthermore, the system memory 720 is partitioned to contain a block for use as graphics memory 765.

The memory security engine 750 receives memory access requests from various users, along with an authenticated user identification (ID). The memory security engine contains a programmable privilege table, which maps memory address ranges, and user IDs to privileges for accessing the memory address ranges. The memory security engine checks the address and authenticated user ID, for the user memory access requests, against the privilege table. If the table indicates that the authenticated user ID has authorization for the particular read or write transaction, the memory access command is executed by the graphic memory interface 755. If the accessed address is not in the table, no special privileges are needed to access the address.

If the table indicates that the user does not have authorization for the particular read or write transaction, the memory security engine 750 provides a memory redirect. In one implementation, the memory security engine 750 returns a predefined value, such as all "0", if the table indicates that the user does not have authorization for reading the specified memory address range. For write access, if the table indicates that the user does not have authorization for writing to the specified memory address, the memory security engine 750 drops the memory access request. Thus, memory is effectively blocked-out for unauthorized memory access requests.

Figure 8:
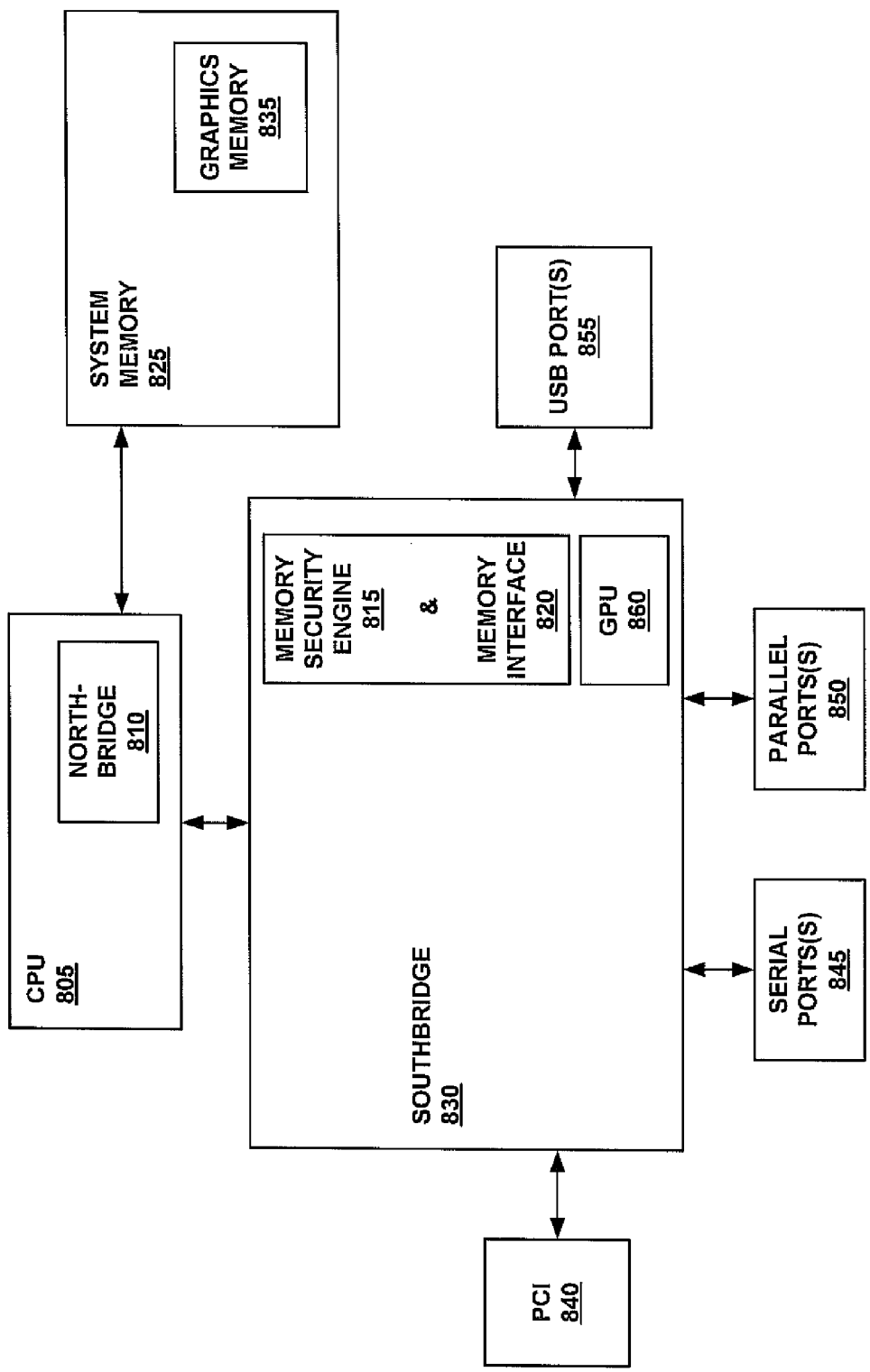
FIG. 8 shows a computer system according to another embodiment of the present invention with a CPU-embedded northbridge circuit and the GPU embedded in the southbridge.

Referring now to FIG. 8, a computer system according to another embodiment of the present invention is shown. As depicted in FIG. 8, the computer system comprises a CPU 805 having a northbridge 810 embedded therein. Furthermore, The CPU 805 is communicatively coupled to system memory 825 and a southbridge 830. The system memory 825 is partitioned to contain a block for use as graphics memory 835. The southbridge 830 has a memory security engine 815 and memory interface 820 embedded therein. The southbridge 830 is communicatively coupled to various I/O ports, such as PCI bus 840, serial ports 845, parallel ports 850, USB ports 855, and the like. Furthermore, the southbridge 830 has a GPU 860 embedded therein.

The memory security engine 815 receives memory access requests from various users, along with an authenticated user identification (ID). The memory security engine 815 contains a programmable privilege table, which maps memory address ranges, and user IDs to privileges for accessing the memory address ranges. The memory security engine 815 checks the address and authenticated user ID, for the user memory access commands, against the privilege table. If the table indicates that the authenticated user ID has authorization for the particular read or write transaction, the memory access request is executed by the graphic memory interface 820. If the accessed address is not in the table, no special privileges are needed to access the address.

If the table indicates that the user does not have authorization for the particular read or write transaction, the memory security engine 815 provides a memory redirect. In one implementation, the memory security engine 815 returns a predefined value, such as all "0", if the table indicates that the user does not have authorization for reading the specified memory address range. For write access, if the table indicates that the user does not have authorization for writing to the specified memory address, the memory security engine 815 drops the memory access command. Thus, memory is effectively blocked-out for unauthorized memory access requests.

Figure 9:
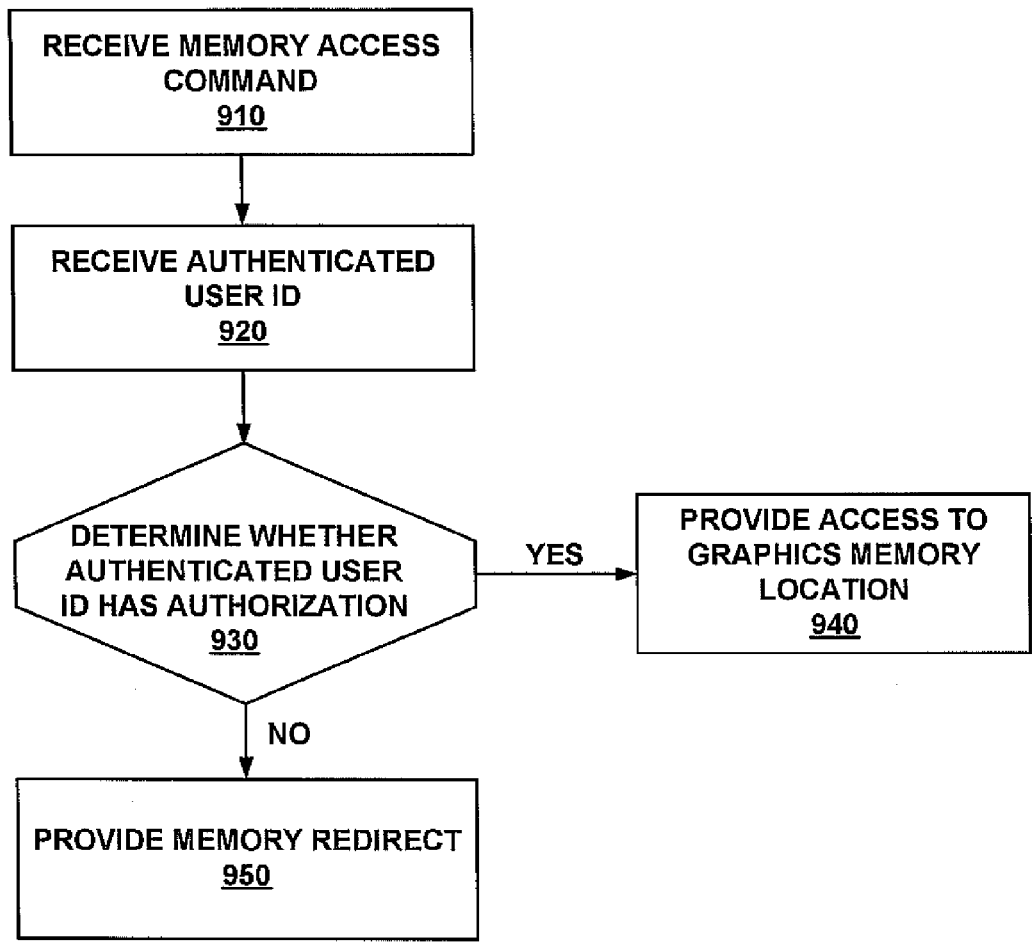
FIG. 9 shows a flow diagram of a security primitive method performed by a secure memory engine in accordance with one embodiment of the present invention.

Referring now to FIG. 9, a flow diagram of a security primitive method performed by a secure memory engine in accordance with one embodiment of the present invention is shown. As depicted in FIG. 9, the secure memory engine receives a memory access request, at step 910. The memory access contains an address of a memory location in graphics memory. The secure memory engine also receives an authenticated user ID at step 920. The authenticated user ID corresponds to the received memory access request of step 910. The secure memory engine then determines whether the authenticated user ID has authorization to access (i.e. read and/or write) the particular memory location, at step 930.

Authorization, in one implementation of the invention, is determine from a privilege table. The privilege table relates user IDs to their corresponding read and write privileges for given address ranges. The privilege table is populated, when a user causes data to be written to the graphics memory. The privilege table is programmable so that a user can specify an address or range of address, user IDs that have privilege to access the address or range of addresses, and whether the corresponding user ID has read, write, or read and write privileges. The privilege table may also be populated with default values.

At step 940, the secure memory engine provides access to the addressed memory location in the graphics memory when the memory access request has a sufficient privilege for accessing the memory location, as determined by the privilege table. The secure memory engine provides a memory redirect when the memory access command does not have sufficient privileges for accessing the memory location, at step 950.

In one implementation, the memory redirect returns a predefined value in response to an unauthorized read memory access command. The memory redirect drops unauthorized write memory access commands.

Thus, authorized memory access requests are executed, while memory is effectively blocked-out for unauthorized memory access requests, by embodiments of the present invention. Embodiments of the present invention also advantageously provide a non-computational intensive security primitive. Embodiments of the present invention also advantageously provide a security primitive, which does not unduly increase image processing latency of the computer system.

Referring now to FIG. 10, a diagram of a privilege table 270 in accordance with one embodiment of the present invention is shown. As depicted in FIG. 10, the privilege table comprises an address range column 1010, a user ID column 1020, and an authorization column 1030. (Various data values stored in the privilege table are represented by "~".) The privilege table relates user IDs to their corresponding read and write privileges for given address ranges. For example a 3D pipeline module of a GPU may only have write privileges for a block of graphics memory (e.g., 0A44-0C44) utilized by a scanout module. Similarly, the scanout module may have read only privileges for the same block of graphics memory, containing pixel data written by the 3D pipeline module.

In an exemplary implementation, a memory security engine receives a read request from the scanout module. The read request comprises a memory access request containing an address (e.g., 0A88) pointing to the block of graphics memory (e.g., 0A44-0C44) containing the pixel data written by the 3D pipeline module. The memory security engine also receives an associated authenticated user ID, of the scanout module, with the memory access request. The address (e.g., 0A88) specified in the memory access request is checked against the address ranges contained in the privilege table. For the address range in which the particular address (e.g., 0A88) points to, the memory security engine checks the received authenticated scanout module ID against the specified user IDs. The table indicates that the scanout module has authorization to read the particular address location (e.g., 0A88), and therefore read access to the memory location is provided.

In another exemplary implementation, the memory security engine receives a read request from the 3D pipeline module. The read request comprises a memory access command containing an address (e.g., 0A88) pointing to the block of graphics memory (e.g., 0A44-0C44) containing the pixel data previously written by the 3D pipeline module. The memory security engine also receives an associated authenticated user ID of the 3D pipeline module, with the memory access request. The address (e.g., 0A88) specified in the memory access request is checked against the ranges contained in the privilege table. For the address range that the particular address (e.g., 0A88) points to, the memory security engine checks the received authenticated 3D pipeline module ID against the specified user IDs. The table indicates that the 3D pipeline is not authorized to read the particular address location (e.g., 0A88), and therefore a memory redirect is executed.

Thus, authorized memory access requests are executed, while memory is effectively blocked-out for unauthorized memory access requests, by embodiments of the present invention. Embodiments of the present invention also advantageously provide a non-computational intensive security primitive. Embodiments of the present invention also advantageously provide a security primitive, which does not unduly increase image processing latency of the computer system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of managing access to graphics memory, comprising:

receiving a memory access request from a device, said memory access request comprising an address;

receiving an authenticated user identification associated with said memory access request;

determining a determined access privilege to said address for said authenticated user identification from a privilege table, wherein the privilege table is populated with a corresponding mapping when a user causes data to be written to a given address in said graphics memory for the first time;

providing access to said graphics memory at said address provided said determined access privilege indicates access to said address is allowed; and denying access to said graphics memory provided said determined access privilege indicates access to said address is not allowed, wherein said device is uniquely identified and providing said access and denying said access is specified on a per device basis.

2. The method according to claim 1, wherein receiving said memory access request, receiving said authenticated user identification, determining said determined access privilege, providing said access, and denying said access are performed within a single semiconductor substrate coupled to said graphics memory.

3. The method according to claim 1, wherein said privilege table relates a plurality of address ranges to a plurality of user identifications, and a plurality of privileges.

4. The method according to claim 3, wherein said determining said determined access privilege further comprises checking said authenticated user identification and said address against said privilege table containing said related plurality of address ranges to said plurality of user identifications, and said plurality of privileges.

5. The method according to claim 1, wherein said method provides for context switching to serve a plurality of users.

6. The method according to claim 1, wherein said privilege table is programmable so that a user can specify one or more mappings, wherein each mapping includes a given address or range of addresses, one or more user identifications that have privileges to access said given address or range of address, and whether said one or more user identifications have read, write, or read and write privileges.

7. The method according to claim 6, wherein said privilege table is also populated with one or more default mappings.

8. The method according to claim 6, wherein any modification to an existing mapping causes the contents of said graphics memory at a particular address or range of addresses specified in said existing mapping to be zeroed.

9. A system comprising:

a memory security engine, wherein the memory security engine comprises:

an input coupled to a first signal path, wherein said first signal path provides an authenticated user identification and a memory access command comprising a memory address;

a privilege table, wherein the privilege table relates one or more authenticated user identifications and one or more memory addresses to one or more access privileges and is programmable so that a user can specify an address or range of addresses, a user identification that has privilege to access said address or range of address and whether said identification has read, write or read and write privileges;

an output coupled to a second signal path, wherein said memory access command is provided when said authenticated user identification has appropriate privilege for said memory address, such that each of a plurality of users is uniquely identified and said memory access command is provided on a per user basis.

10. The system according to claim 9, further comprising:

a graphic memory interface coupled to said output of said memory security engine; and a graphics processing unit coupled to said input of said memory security engine, the graphics processing unit providing said memory address, said memory address being associated with said authenticated user identification.

11. The system according to claim 9, further comprising:

a graphics processing unit; and a graphic memory interface, wherein the graphic memory interface is communicatively coupled to said graphic processing unit, and wherein said memory security engine is embedded in said graphic memory interface.

12. The system according to claim 11, further comprising:

a chipset having a graphics port, wherein the graphics processing unit is communicatively coupled to said graphics port.

13. The system according to claim 11, further comprising:

a chipset, wherein the graphics processing unit is embedded in said chipset.

14. The system according to claim 9, further comprising:

a graphics processing unit, wherein the memory security engine is embedded in a back-end of said graphics processing unit; and a graphic memory interface; wherein the graphic memory interface is communicatively coupled to said graphic processing unit.

15. The system according to claim 14, further comprising:

a chipset comprising an accelerated graphics port, wherein the graphics processing unit is communicatively coupled to an accelerated graphics port.

16. The system according to claim 14, further comprising:

a chipset, wherein the graphics processing unit is embedded in said chipset.

17. The system according to claim 9, wherein said memory access request is redirected when said authenticated user identification does not have said privilege for said memory address.

18. The system according to claim 17, wherein said redirecting said memory access requests comprises returning a pre-defined value.

19. The system according to claim 17, wherein said redirecting said memory access command comprises dropping the memory access command.

20. The system according to claim 9, said memory security engine provides a secure memory primitive.

21. The system according to claim 9, wherein said privilege table is embedded in the memory security engine.

22. The system according to claim 9, wherein said privilege table is stored in a memory.

23. The system according to claim 9, further comprising:

a processor (CPU);

a northbridge coupled to said CPU;

a southbridge coupled to said northbridge;

a graphics processing unit (GPU) coupled to said northbridge, wherein said memory security engine is embedded in said GPU;

a graphic memory interface embedded in said GPU.

24. The system according to claim 9, further comprising:
a processor (CPU);
a bridge chip coupled to said CPU, wherein said memory security engine is embedded in said bridge chip;
a graphics processing unit (GPU) embedded in said bridge chip; and
a memory interface embedded in said bridge chip.

25. The computer system according to claim 9, further comprising:
a processor (CPU);
a northbridge embedded in said CPU;
a southbridge coupled to said CPU, wherein said memory security engine is embedded in said southbridge;
a memory interface embedded in said southbridge; and
a graphics processing unit embedded in said southbridge.

26. An apparatus for performing secure memory transactions comprising:
a means for relating a plurality of address ranges to a plurality of authenticated user identifications and a plurality of privileges that is programmable when a given address range is first written to;
a means for receiving a request, wherein said request comprises a memory address and an authenticated user identification;
a means for determining authorization for said request based upon said plurality of address ranges, said plurality of authenticated user identifications and said privileges;
a means for providing access to a location in memory if said request is authorized; and
a means for providing a redirect if said request is not authorized, such that each of a plurality of users is uniquely identified and said privileges are provided on a per user basis.

27. The apparatus according to claim 26, wherein said means for providing a redirect comprises dropping said request, wherein said request further comprises a write instruction.

28. The apparatus according to claim 26, wherein said means for providing a redirect comprises returning a predefined value, wherein said request further comprises a read instruction.

29. A circuit comprising:
a graphics memory for storing image data therein; and
a graphics processing unit (GPU) for processing graphics commands and data for generating image data for display, wherein said graphics commands comprise respective authenticated user identification and respective memory addresses, said GPU comprising:
a) a plurality of graphics modules for performing different graphics operations; and
b) a graphics memory interface coupled to said plurality of graphics modules and for performing access operations to said graphics memory, wherein said graphics memory interface comprises a security engine module for indexing a table of data with an authenticated user identification and a memory address associated with a graphics command to validate said graphics command such that only validated commands are allowed to access said graphics memory, such that each of a plurality of users is uniquely identified and said access is provided on a per user basis, and wherein said table is programmable with one or more mappings of memory address ranges and user identifications to privileges when a user causes data to be written to a given address in said graphics memory.

30. The circuit as described in claim 29, wherein said plurality of graphics modules comprise a three dimensional pipeline module for processing graphics primitives to generate image data therefrom.

31. The circuit as described in claim 30, wherein said plurality of graphics modules further comprise a scanout module for cyclically accessing said graphics memory to generate a screen display signal.

32. The circuit as described in claim 31, wherein said plurality of graphics modules further comprise an MPEG module for processing MPEG graphics commands.

33. The circuit as described in claim 29, further comprising an authenticating module for authenticating said graphics commands in advance of said graphics commands on a per device basis being processed by said graphics memory interface.

34. The circuit as described in claim 33, wherein said GPU comprises said authenticating module in a GPU front-end.

35. The circuit as described in claim 34, wherein said graphics memory interface is disposed within a GPU back-end.

36. The circuit as described in claim 29, wherein said graphics memory interface is adapted to receive graphics commands directly from a host processor.

37. A computer system comprising:
a CPU;
a main memory, said memory storing programs for said CPU; and
a memory security engine, wherein the memory security engine comprises:
an input coupled to a first signal path, wherein said first signal path provides an authenticated user identification and a memory access command from said CPU comprising a memory address;
a privilege table programmable by a user when said user causes data to be written to a given address in said memory, wherein the privilege table relates said authenticated user identification and said memory address to an access privilege;
an output coupled to a second signal path, wherein said memory access command is provided when said authenticated user identification has appropriate privilege for said memory address, such that each of a plurality of users is uniquely identified and the memory access command is provided on a per user basis.

38. The computer system according to claim 37, further comprising:
a graphic memory interface coupled to said output of said memory security engine; and
a graphics processing unit coupled to said input of said memory security engine, the graphics processing unit providing said memory address, said memory address being associated with said authenticated user identification.

39. The computer system according to claim 37, further comprising:
a graphics processing unit; and
a graphic memory interface, wherein the graphic memory interface is communicatively coupled to said graphic processing unit, and wherein said memory security engine is embedded in said graphic memory interface.

40. The computer system according to claim 37, further comprising:

a graphics processing unit, wherein the memory security engine is embedded in a back-end of said graphics processing unit; and a graphic memory interface; wherein the graphic memory interface is communicatively coupled to said graphic processing unit.

41. The computer system according to claim 37, wherein said memory access request is redirected when said authenticated user identification does not have said privilege for said memory address.

42. The computer system according to claim 37, said memory security engine provides a secure memory primitive.

43. The computer system according to claim 37, further comprising:

a northbridge coupled to said CPU;

a southbridge coupled to said northbridge;

a graphics processing unit (GPU) coupled to said northbridge, wherein said memory security engine is embedded in said GPU;

a graphic memory interface embedded in said GPU.

44. The computer system according to claim 37, further comprising:

a bridge chip coupled to said CPU, wherein said memory security engine is embedded in said bridge chip;

a graphics processing unit (GPU) embedded in said bridge chip; and a memory interface embedded in said bridge chip.

45. The computer system according to claim 37, further comprising:

a memory interface embedded in said CPU for interfacing to said main memory;

an input/output chip coupled to said CPU, wherein said memory security engine is embedded in said input/output chip;

a memory interface embedded in said input/output chip; and a graphics processing unit embedded in said input/output chip.

46. A method of managing access to graphics memory, comprising:

receiving a memory access request comprising an address;

receiving an authenticated user identification associated with said memory access request;

determining a determined access privilege to said address for said authenticated user identification from a privilege table, wherein the privilege table is programmed when a user causes data to be written to a given address in said graphics memory;

providing access to said graphics memory at said address provided said determined access privilege indicates access to said address is allowed; and denying access to said graphics memory provided said determined access privilege indicates access to said address is not allowed.

47. The method according to claim 46, wherein receiving said memory access request, receiving said authenticated user identification, determining said determined access privilege, providing said access, and denying said access are performed within a single semiconductor substrate coupled to said graphics memory.

48. The method according to claim 47, wherein said privilege table relates a plurality of address ranges to a plurality of user identifications, and a plurality of privileges.

49. The method according to claim 48, wherein said determining said determined access privilege further comprises checking said authenticated user identification and said address against said privilege table containing said related plurality of address ranges to said plurality of user identifications, and said plurality of privileges.

50. The method according to claim 46, wherein said method provides for context switching to serve a plurality of users.

* * * * *